3,137,714
PREPARATION OF ORGANOMERCURIALS

Hugh E. Ramsden, Scotch Plains, N.J., Carlton G. Force, Castorland, N.Y., and Hugh F. Shannon, Scotch Plains, N.J., assignors to Esso Research and Engineering Company, a corporation of Delaware
No Drawing. Filed Oct. 27, 1960, Ser. No. 65,289
6 Claims. (Cl. 260—431)

The present invention relates to a process for the preparation of alkyl and cycloalkyl mercury compounds via a Grignard-type reaction. More specificlly, it relates to a two stage process wherein in the first stage magnesium, preferably cheap magnesium turnings, is reacted with an alkyl halide by continuously adding during the course of the reaction small amounts of either a metallo organo oxide catalyst or preferably an alcohol and reacting in a second stage the product from the first stage with a mercury halide, or a hydrocarbon mercury halide. Yet more specifically it relates to the carrying out of both stages of the above described process in the presence of an inert aromatic or aliphatic hydrocarbon solvent, preferably the same solvent in both stages of the process. Most specifically it relates to the synthesis of saturated organo-mercury compounds, e.g., dibutyl mercury, that are useful gasoline and oil additives.

Heretofore in the preparation of organomercury compounds via Grignard type reactions it was though necessary to carry out the first stage of the process in the presence of a large excess of an ether, especially diethyl ether, in order to sufficiently activate the magnesium to form the Grignard reagent. Additionally it was thought necessary in order to obtain high yields to carry out the second stage of the process in a medium in which the mercuric chloride is soluble, e.g., a suitable ether. Preferably, of course, the same ether solvent required for the Grignard reagent preparation would be used.

While it has now been discovered that a particularly economic preparation of organomercury compounds in high yields can be obtained specifically by using a cyclic ether such as tetrahydrofuran rather than diethyl ether in the process above described the non-ether catalyzed process described below is preferred, for the reasons also described below.

Although diethyl ether is an excellent catalyst for Grignard reactions, it is hazardous to work with on a commercial scale. Moreover, it is usually necessary to employ large quantities of diethyl ether (or a cyclic ether) in a Grignard synthesis and this makes most processes costly, since it is necessary to employ expensive recovery techniques in order to avoid substantial loss of the said ether. All of the foregoing difficulties are avoided or substantially eliminated by the present process in which organo oxide or alcohol catalysts in the presence of controlled amounts of an inert hydrocarbon solvent are utilized. These catalysts are not hazardous and are used in relatively small amounts. Thus, no separation and recovery of catalyst are required and the difficult problems encountered in recovering expensive diethyl ether from the recation products are avoided.

It has now further surprisingly been discovered that the reaction products and hydrocarbon solvent from the first stage of the process may be reacted directly with the mercuric halide in a heterogeneous reaction mixture to obtain high yields of the desired saturated organo mercury compounds. Thus an integrated economic process for the synthesis of these mercury compounds has been discovered which requires neither expensive ether solvent in the first stage of the process to activate the magnesium nor the same ether solvent in the second stage to dissolve the mercuric halide.

Finally it has now been discovered that by utilizing in the first stage of the process specifically the procedure of continuously adding the catalyst or alcohol that these materials have an activity that is substantially equivalent to that of diethyl ether. Thus, cheap magnesium turnings or other coarse magnesium rather than the expensive and dangerous almost pyrophoric 200 mesh or finer magnesium powder otherwise required may be used. This, of course, rounds out the economic desirability of the present process.

In accordance with the present invention, organomercury compounds are prepared by reacting under anhydrous conditions an alkyl or cycloalkyl halide with coarse magnesium in the presence of a hydrocarbon solvent and a small amount of a metal organo oxide or alcohol catalyst added continuously or in increments during the course of the reaction. Preferably the catalyst or alcohol is added with the hydrocarbon solvent and the alkyl or cycloalkyl halide to the magnesium turnings. Following completion of the reaction the reaction products from the first stage are reacted with a mercury halide or hydrocarbon mercury halide compound in a second stage. The reactions involved are as follows:

Stage 1:

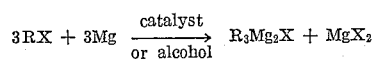

Stage 2:

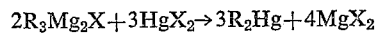

or

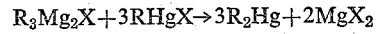

wherein each R is the same or a different alkyl or cycloalkyl group and X is a halogen atom.

The alkyl or cycloalkyl halide reactant "RX" may be any suitable chloride, bromide or iodide compound having 1 to 8 carbon atoms. Among the iso- and n-alkyl halides which are useful in the practice of the process are butyl chloride, methyl chloride, ethyl chloride, butyl bromide, isobutyl chloride and hexyl chloride. Suitable cycloalkyl halides include compounds, such as cyclohexyl chloride and cyclopentyl bromide. Of the foregoing compounds butyl bromide and especially butyl chloride are preferred reactants because of the high reactivity of these halogen compounds and the large number of uses for butyl mercury compounds.

While the magnesium metal used in the synthesis of the organomercury compounds may be in any useful form, e.g., turnings, chips, foil or coarse powder, magnesium turnings are preferred because they are relatively inexpensive and may be utilized without difficulty.

It is advisable, and generally necessary, to activate the magnesium turnings with a small amount of an alkyl halide compound, such as ethyl or butyl bromide. It is also sometimes useful to add a crystal of two of iodine to the reaction medium to assist in the initiation of the reaction. These and other well known methods for initiating Grignard reactions may be employed where necessary.

The metal organo oxide catalyst comprises the reaction product of a Group I to III metal (Periodic Chart of Elements in Lange's Handbook of Chemistry, 8th Edition, pages 56–57), such as magnesium, aluminum, zinc or sodium, and a primary, secondary or tertiary aliphatic or cyclic alcohol, such as isopropyl alcohol, propanol, ethanol, n-lauryl alcohol, benzyl alcohol, tertiary butyl alcohol and phenol. In general, the organic radical(s) attached to the metal will contain 1 to 15 carbon atoms and may have one or more other functional groups, such as a carbonyl group. It is preferred to utilize in the first stage of the process an alcohol rather than the above described metal organo catalysts. These alcohols are the $C_1$–$C_{15}$ alcohols described above, which alcohols also may have one or more other functional groups, such as a carbonyl group. The preferred alcohols are $C_1$–$C_6$ alkyl monoethers of ethylene and polyethylene glycols, e.g., the monoethyl, mono-n-butyl and monomethyl ethers of ethylene glycol, the carbitols such as the monoethyl, mono n-butyl and monomethyl ethers of diethylene glycol and the monoethyl, mono n-butyl and monomethyl ethers of triethylene glycol and tetraethylene glycol.

It will be found that stoichiometric amounts of the reagents will produce satisfactory results. However, the quantity of each reactant may be varied according to the yield, rate of reaction and product desired. In a preferred embodiment using 1 mole of magnesium metal as a reference point, about 0.5 to 1.5, e.g., 1.0 mole of hydrocarbon halides reactant (RX) may be used. Additionally, preferably the amount of the metal organo oxide catalyst or alcohol used may be about 0.005 to 0.5, e.g., .05 mole per mole of magnesium and the amount of inert solvent used may be about 100 to 1000 ml. per mole of magnesium metal. With the preferred alkyl monoethers of ethylene and polyethylene glycols, for example the monoethyl ether of diethylene glycol, the preferred ratio of these materials to magnesium turnings is from 0.01:1 to .07:1, e.g., .05:1.

The reaction in Stage 1 is conveniently effected at temperatures ranging from approximately room temperature to about 150° C. The reflux temperature of the solvent, which may be any of the inert hydrocarbon liquids below described, is highly suitable for establishing the temperature at which this reaction is carried out, provided the aforesaid reflux temperature does not substantially exceed 150° C. Once the reaction has commenced, the reaction usually takes from two to four hours to reach completion.

Following completion of the reaction in Stage 1 of the two stage process the entire reaction products are reacted with a mercuric halide or a hydrocarbon mercury halide at temperatures of 0–50° C., e.g., 40° C. The mercuric halide reagent should, of course, be anhydrous and essentially free of any interfering impurities that may reduce the reaction rate or decrease the yield. For most purposes it will be found that mercuric halides having a purity of at least 90% will be entirely satisfactory. While the most common and useful reagent is mercuric chloride, the other inorganic halides such as mercuric bromide, and mercuric iodide and the hydrocarbon mercury halide compounds, in which mercury has a valence of 2, may be employed. Hydrocarbon mercury halides, such as $C_1$–$C_8$ alkyl or $C_5$–$C_8$ cycloalkyl mercuric halides, e.g., methyl or phenyl mercuric chloride, may be substituted for the mercuric chloride reagent.

If a hydrocarbon mercury halide is employed, the mole ratio of the alkyl or cycloalkyl mercuric halide to the magnesium compound should be approximately 0.1:1 to 3.0:1, e.g., 1.5:1. Where a mercuric halide is used the mole ratio of the mercuric halide to the magnesium compound may well vary from 0.05:1 to 1.5:1, e.g., 0.8:1.

Substantially any aliphatic or aromatic hydrocarbon may be employed as a solvent in the present two stage process. The preferred inert solvents for the present process are liquid hydrocarbons having 4 to 8 or 10 carbon atoms, such as benzene, toluene, heptane, octane, pentane and isoheptane. The amount of solvent utilized in both stages of the process is preferably 100–1000 mls., e.g., 500 mls. of solvent per mole of magnesium metal in Stage 1 or per one-third mole of the $R_3MgX_2$ Grignard in Stage 2.

Following reaction the reaction mixture is hydrolyzed with an aqueous acid to destroy unreacted Grignard reagents and to dissolve the magnesium salts. Paraffins and basic magnesium salts are formed from said reagent in the absence of acids. Any suitable acid may be used, such as HCl, $H_2SO_4$, or acetic acid, in concentrations of 1 to 4 wt. percent, e.g., 3 wt. percent. The amount of weak acid used based on total hydrocarbons should be in the range of 10 to 20 wt. percent. Following hydrolysis, an organic layer is separated from an aqueous layer from which also any metallic mercury formed is recovered. The organic layer after drying is then vacuum stripped and distilled by conventional techniques to obtain a separation of the desired relatively pure product.

In a preferred embodiment the reaction in Stage 2 may be utilized to obtain additional yields of the desired alkyl or cycloalkyl mercury compounds. As previously mentioned, alkyl or cycloalkyl mercuric chloride compounds may be used rather than mercuric chloride in the reaction with the Grignard type reagent. Thus, the following sequence of reactions is utilized to obtain from one mole of dialkyl mercury two moles of dialkyl mercury product:

(1) $R_2Hg + HgX_2 \longrightarrow 2RHgX$

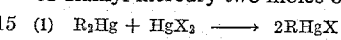

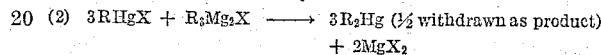

(2) $3RHgX + R_3Mg_2X \longrightarrow 3R_2Hg$ (½ withdrawn as product) $+ 2MgX_2$ wherein R is an alkyl or cycloalkyl group and X is a halogen atom. It should be noted that in Reaction 1 the yield is approximately 100% and in Reaction 2 the yield is very high. An additional advantage of this process is that mercuric chloride is very susceptible to reduction in contact with magnesium or sodium metals. Alkyl-mercuric halides are much less so. Thus, as shown a cyclic process is obtained wherein the mercuric chloride is kept free of contact with any active metal. The first step of the reaction described above is conducted at temperatures in the range of 10° C. to 100° C., e.g., 40° C. utilizing approximately stoichiometric amounts of the reactant. Relative molar amounts of the reactants may be in reaction 1 above in the range of 0.5:1.0 to 2:1.0, e.g., 1.0:1.0 of the dialkyl or dicycloalkyl mercury compound to the mercuric chloride compound and in Reaction 2 as previously described. In a preferred embodiment the mercuric halide is added after separation of the dialkyl mercury from the reaction zone products. Any of the solvent described above, e.g., toluene, may of course also be used in this reaction. The amount of solvent may be 100 to 1000 mls. per mole of the dialkyl or dicycloalkyl mercury compound.

EXAMPLE

Stage 1

Reactants:
Magnesium turnings—
    1 gram atom=24.3 g.
    Butyl bromide, 2 ml.
Initiator—
    Dimethyl ether of tetraethylene glycol, 3 ml.
    Ethyl ether, 5 ml., $I_2$ if needed.
Mix—
    n-Butyl chloride, 1.0 mole, 92.5 g.
    Toluene, 300 ml.
    Ethoxyethanol, 0.05 mole, 4.5 g.

Procedure: The magnesium was placed in a one liter 3-neck flask, equipped with a stirrer, dropping funnel, thermometer, and reflux condenser. After the apparatus was flushed out with nitrogen, the initiator ingredients were added, then an iodine crystal, and 10 ml. of the n-butyl chloride mix. Finally, 2 ml. of tetrahydrofuran and 1 ml. of ethyl bromide were added to start the reaction. Twelve minutes were required to initiate the reaction. Following this the mix was added dropwise at a rapid rate over a period of 2 hours and 21 minutes. Initially, the reaction was exothermic, but after one eighth of the mix had been added external heating was started. The mixture was stirred and refluxed until the reflux temperature reached 110° C. and for 35 minutes more. It was then allowed to stand overnight.

An attempt was made to repeat the above procedure except that all of the alcohol was added to the initiator mixture and magnesium turnings prior to the addition of the butyl chloride toluene solution. Essentially no reaction was seen to occur.

*Stage 2*

A slurry of the (108.6 g. (0.4 mole)) mercuric chloride in toluene was added slowly, keeping the temperature at 40° C. or lower. In all, 360 ml. of toluene was used for the slurry. Addition took 26 minutes. The mixture was stirred for 1 hour, 15 minutes without heating (temperature between 40 and 45° C.) and finally heated at 45° C. for 1 hour, 45 minutes. The temperature was then raised over a period of two hours to 110° C. and was kept there for 1 hour, 20 minutes. It was then allowed to stand overnight.

The mixture was then cooled to below 20° C. and 50 ml. of water added, then 200 ml. of water and 45 ml. of concentrated HCl. During the addition considerable gas was evolved. The mixture was allowed to warm to room temperature and the layers were separated. Metallic mercury (21.0 g., 0.104 mole) was recovered. After drying over Drierite, the organic layer was vacuum stripped through a 30 cm. Vigreux column to a final temperature of 90° C. and a pressure of 37 mm. of Hg. The residue was distilled at a pressure of 4 mm. The dibutylmercury came over very cleanly; there were only traces of butylmercuric chloride present. A recovery of 77.6 g. of dibutylmercury was found. There was considerable hold-up in the still pot and Vigreux, possibly as much as 10 g.

The yield of 77.6 g. of dibutylmercury corresponds to a 49.3% yield based on magnesium, 61.7% based on the mercuric chloride, and 83.3% based on the mercuric chloride less the recovered mercury metal.

The foregoing description contains a limited number of embodiments of the present invention. It will be understood that this invention is not limited thereto since numerous variations are possible without departing from the scope of the following claims.

What is claimed is:

1. In the process wherein a diorganomercury compound is prepared by reacting an organomagnesium halide with a mercury halide, the improvement which consists essentially of preparing said organomagnesium halide by reacting magnesium metal with a hydrocarbon halide selected from the group consisting of $C_1$ to $C_8$ alkyl halides and $C_5$ to $C_8$ cycloalkyl halides in an inert liquid hydrocarbon medium and in the presence of an alcohol compound selected from the group consisting of $C_1$ to $C_{15}$ alcohols and monoalkyl ethers of monoethylene and $C_4$ to $C_8$ polyethylene glycols wherein the alkyl groups are $C_1$ to $C_6$ alkyl groups, said alcohol compound being added in increments during the course of the reaction, the total amount of said alcohol compound added being between 0.005 and 0.5 mole per mole of magnesium and contacting the resulting organomagnesium halide with a mercury halide in an inert liquid hydrocarbon medium, said mercury halide being selected from the group consisting of mercuric halides and $C_1$ to $C_8$ hydrocarbyl mercury halides.

2. The process of claim 1 in which the alcohol compound is a $C_2$–$C_6$ alkyl monoether of ethylene glycol.

3. The process of claim 1 in which the alcohol compound is a $C_1$–$C_6$ alkyl monoether of diethylene glycol.

4. The process of claim 1 in which the inert hydrocarbon solvent is a hydrocarbon selected from the group consisting of $C_4$–$C_{10}$ aliphatic and $C_6$–$C_{10}$ aromatic hydrocarbons.

5. The process of claim 1 in which the magnesium is coarse magnesium having a particle size larger than 200 mesh.

6. A two stage process for preparing dibutyl mercury which consists essentially of reacting, in a first stage at temperatures of room temperature to 150° C., coarse magnesium metal having a particle size larger than 200 mesh with 0.5 to 1.5 moles of n-butyl chloride per mole of magnesium metal in the presence of 100–1000 mls. of toluene per mole of magnesium and 0.01 to 0.07 moles of monoethyl ether of diethylene glycol per mole of magnesium to obtain a Grignard type magnesium compound, the said monoethyl ether of diethylene glycol being added continuously during the course of the reaction, and in the second stage reacting the entire reaction product from the first stage with 0.05 to 1.5 moles of mercuric chloride per mole of the Grignard type magnesium compound formed in said first stage.

References Cited in the file of this patent

FOREIGN PATENTS 577,871    Italy _____ June 13, 1958

OTHER REFERENCES

Ind. and Eng. Chem., vol. 33, No. 2 (194), p. 172.

"Grignard Reactions of Nonmetallic Substances," Kharasch et al., New York, 1954, pp. 50–53.

"Organo-Metallic Compounds," G. E. Coates, London, 1956, pp. 47–49.